Dec. 9, 1952

L. E. CUCKLER 2,621,315

MEANS REGULATING RESET ACCUMULATION

Filed Feb. 15, 1950

INVENTOR.
LEE E. CUCKLER

BY
Arthur H. Swanson
ATTORNEY.

Dec. 9, 1952          L. E. CUCKLER          2,621,315
MEANS REGULATING RESET ACCUMULATION
Filed Feb. 15, 1950          2 SHEETS—SHEET 2
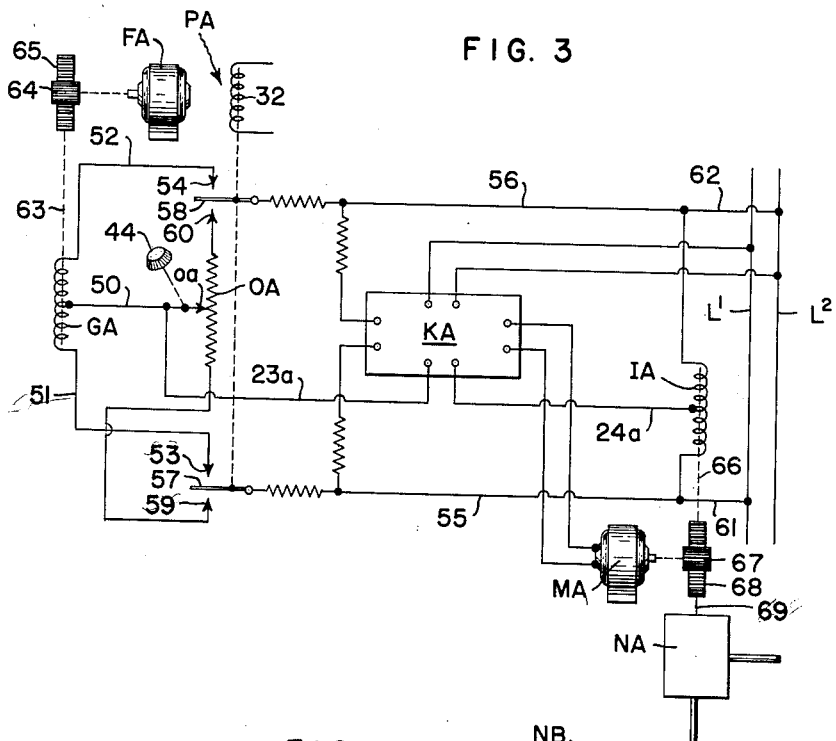
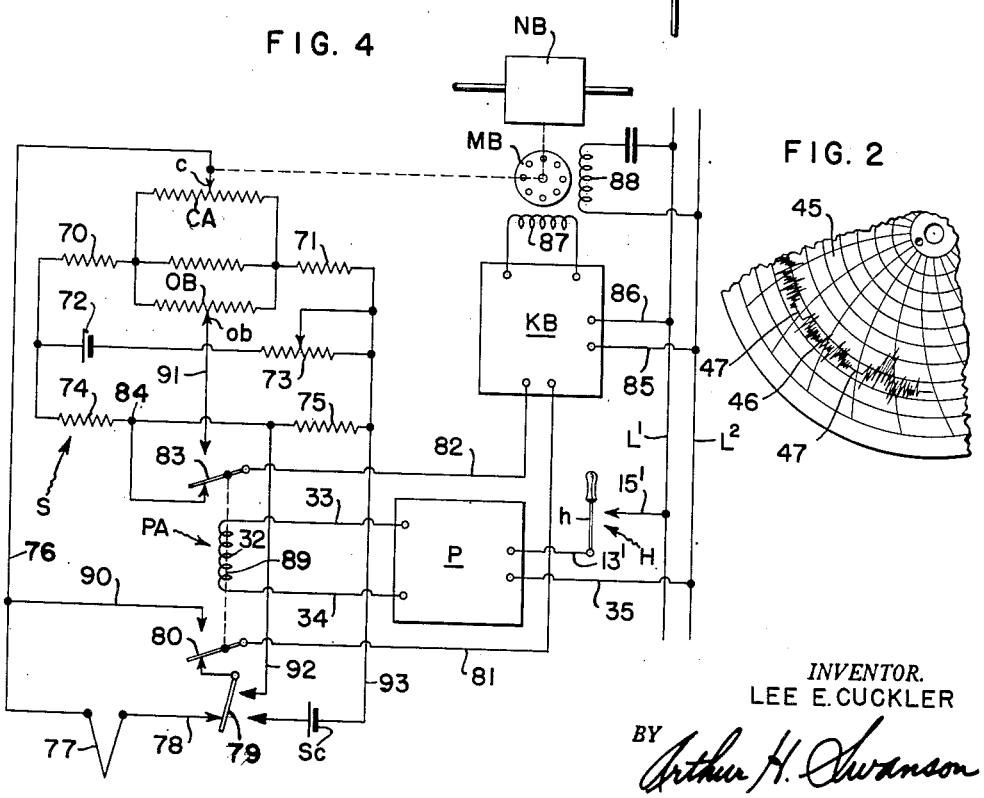
INVENTOR.
LEE E. CUCKLER
BY Arthur H. Swanson
ATTORNEY.

Patented Dec. 9, 1952

2,621,315

UNITED STATES PATENT OFFICE 2,621,315

MEANS REGULATING RESET ACCUMULATION

Lee E. Cuckler, Philadelphia, Pa., assignor to Minneapolis-Honeywell Regulator Company, Minneapolis, Minn., a corporation of Delaware Application February 15, 1950, Serial No. 144,370

11 Claims. (Cl. 318—29)

The general object of the present invention is to provide control apparatus including reset mechanism with novel and effective means for preventing objectionable reset accumulation. The present invention relates particularly to control apparatus operative to provide automatic control of the character known as "proportional-reset mode of control." The proportional-reset mode of control is well known, widely used, and useful, and is defined in precise technical terms in the portion of a report of the Terminology Committee of the American Society of Mechanical Engineers appearing on page 136 of the periodical "Mechanical Engineering" for February, 1946.

The general nature of proportional-reset control becomes readily apparent when account is taken of its operating effect in controlling some readily understandable process such, for example, as the regulation of the fuel supply to a heating furnace so as to minimize the departure of the furnace temperature from a desired normal or "set-point" temperature. In the operation of such a furnace, the rate at which fuel must be supplied to minimize the departure of the actual furnace temperature from a predetermined or set-point temperature must increase or decrease on an increase or decrease in the furnace load, or amount of heat which the furnace must supply to produce the desired material heating action. The material heated may be, for example, metal billets being heated in a billet heating furnace, or it may be water to be converted into steam in a boiler furnace. When the furnace load is increased with no change in the rate of fuel supply, the furnace temperature must decrease. On an increase in the furnace load, means, responsive to the resultant decrease in the furnace temperature may be used to effect automatically a corrective increase in the rate of fuel supply proportional to the reduction in the furnace temperature. It hardly needs to be pointed out that control operations and results which are the converse of those just described are produced on a decrease in the furnace load with a resultant increase in the furnace temperature.

Such proportional control of itself will not be satisfactorily stable unless it is "regulation with a drooping characteristic": i.e., regulation which permits of a certain definite though non-uniform rate of reduction in the furnace temperature as the furnace load increases. The amount of furnace temperature decrease, or "droop," required for stable operation depends upon the character of the furnace load, the type of the furnace, and other operating conditions. In proportional-reset control of a furnace, the "droop," or decrease in furnace temperature with increase in furnace load may be substantially compensated for by a reset control action. That action produces a continuous, but relatively slow increase in the rate of fuel supply throughout the period in which the furnace temperature is below the normal or set-point value. The conjoint effect of the proportional and compensating or reset control actions will be to return eventually the furnace temperature approximately to the set-point value, if the control apparatus and furnace have the capacity to suitably increase the rate of fuel supply and furnace heat output.

The Mallory Patent 2,202,218 of May 28, 1940, discloses the structure and mode of operation of a commercial air control instrument of a well-known type, which is adapted to provide the proportional-reset mode of control, and which includes provisions for limiting the accumulation of reset when the capacity of the control apparatus is insufficient to return the controlled temperature to its normal or set-point value. A specific object of the present invention is to combine control apparatus of the general character disclosed in said Mallory patent, with novel means for preventing objectionable reset accumulation under conditions in which an objectionable accumulation of reset cannot be avoided with the apparatus disclosed in the Mallory patent, or with any prior control apparatus known to me. A further and practically important object of the invention is to provide simple and effective means for making the automatic control apparatus wholly or partially inoperative during periods in which conditions exist which would result in undesirable reset accumulation, if the control apparatus were left in its normal condition.

An important field of use of the present invention is in the control of industrial processes of a nominally continuous type, in which the normal operation is necessarily interrupted at relatively frequent intervals, and for periods which may vary from a minute or so up to a half hour or longer. In some such processes, the process interruption of itself produces an appreciable departure of the controlled variable from its normal value. A desirable form of the present invention, especially devised for use in the control of a process of the last mentioned type, includes means for eliminating automatic control on an interruption of the process operation and means for automatically restoring automatic control only after the process operation has been resumed and has continued for a predetermined period to permit normal operation conditions to be restored.

Apparatus embodying the present invention may take widely different forms, and may be used for very different purposes, and in the accompanying drawings, I have illustrated apparatus of different forms and adapted to serve different purposes.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 2 illustrates a chart record obtainable in the use of apparatus shown in Fig. 1;

Fig. 3 is a circuit diagram illustrating a modification of the apparatus shown in Fig. 1; and Fig. 4 is a diagrammatic representation of another embodiment of my invention.

Figure 1:
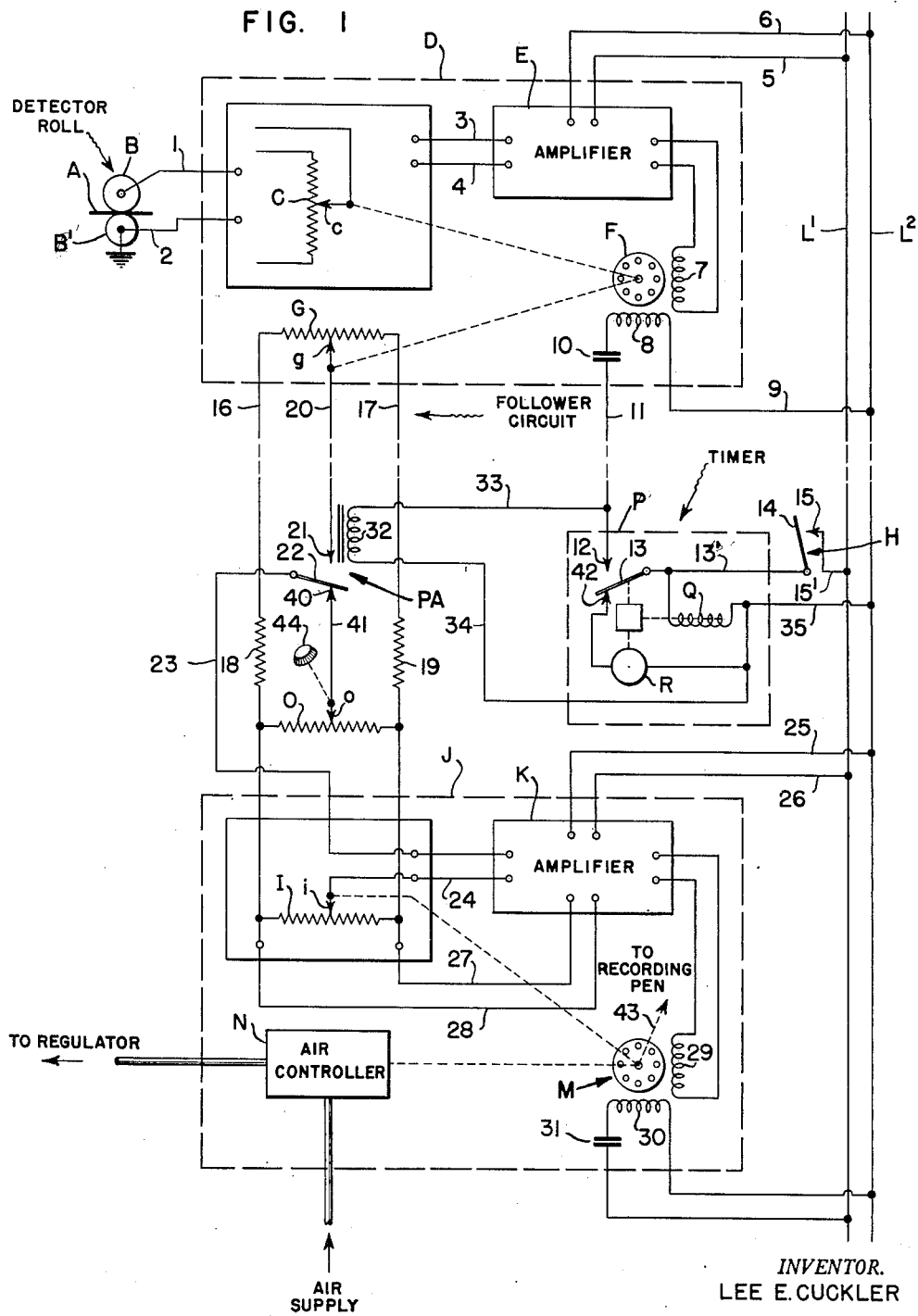
Fig. 1 is a diagrammatic representation of "slasher" control apparatus including means for preventing reset accumulation during shut-down periods and during an operating period of predetermined duration following each shut-down.

The embodiment of the invention illustrated by way of example in Fig. 1, comprises apparatus, commonly called a "slasher," for moving material such as warp yarn, or a paper or textile web, through a sizing bath and then over drying rolls, and comprises apparatus for measuring and regulating the moisture content of the material leaving the slasher by measuring its electrical conductivity. The moisture content measurement is effected indirectly by measuring the electrical conductivity of the material A moved between electrical contact elements B and B' which may be metallic drums or rolls revolving about fixed axes at the outlet end of the slasher, as are analogous contact elements of the moisture measuring apparatus shown in the Wills Patent 2,215,805 of September 24, 1940. The measuring circuit including the contact elements B and B' also includes the yarn or fabric passing between the contacts, a circuit energizing source of unidirectional current, and a slide wire resistor C.

The slide wire resistor C forms a part of a self-balancing measuring instrument D. The latter includes an amplifier and motor drive device E for operating a rebalancing motor F to adjust a slider contact $c$ along the slide wire resistor C, as required to rebalance the measuring circuit when unbalanced as a result of a change in the moisture content, and hence in the resistance, of the material A passing between the contact elements B and B'. The measuring apparatus included in the instrument D may be of the type shown in Fig. 7 of the Wills Patent 2,215,805, and includes an electronic converter for converting a unidirectional current unbalance signal into alternating current preparatory to its amplification. The amplified alternating current signal is proportional in magnitude to the unamplified unidirectional signal, and is of one phase or of the opposite phase, accordingly as the direction of unbalance is in one direction or the opposite direction. Advantageously, the electronic motor drive amplifier and rebalancing mechanism is of the widely used type which is disclosed and claimed in the Wills Patent 2,423,540 of July 8, 1947.

The measuring instrument D is of the blind type including no indicating or recording mechanism. However, it does include a transmission element G in the form of a slide wire engaged by a slider contact $g$ which is adjusted along the slide wire G by the rebalancing motor F. The adjustments given the slider contact $g$ are effected simultaneously with the adjustments given the contact $c$, and are proportional to the last mentioned adjustments. The contacts B and B' are connected into the measuring circuit including the slide wire C by conductors 1 and 2. The measuring circuit has output conductors 3 and 4 connected to the input terminals of the amplifier and motor drive device E. The latter is energized by alternating current supply conductors L' and $L^2$ through branches 5 and 6. The conductors L' and $L^2$ may supply current of ordinary frequency and voltage, for example, 60 cycles per second, and 115 volts. The rebalancing motor F, as shown, comprises a control winding 7 connected to the output terminals of the amplifier and motor drive device E, and comprises a power winding 8. In normal operation, the power winding 8 is connected across the supply conductors L' and $L^2$ through a circuit comprising a conductor 9, a condenser 10, a conductor 11, a stationary switch contact 12, a movable switch member 13, a conductor 13', a switch H including a movable switch member 14 and a stationary switch contact 15, and a conductor 15' connecting the contact 15 to the supply conductor L'. The switch H may be manually or automatically controlled and is closed when, and only when, the slasher is operating at full speed. The switch member 13 and the stationary contact 12 which it engages in normal operation, form parts of a timer mechanism P hereinafter described.

The terminals of the transmission element G are connected by conductors 16 and 17, including resistances 18 and 19, respectively, to the terminals of the slide wire resistor I of a self-balancing measuring instrument J. In normal operation, the slider contact $g$ is connected to a slider contact $i$ which is in engagement with the slide wire resistor I. As shown, the means so connecting the contacts $g$ and $i$ comprise a conductor 20 connecting the contact $g$ to a stationary switch contact 21, a movable switch member 22 in engagement with the contact 21 in normal operation, a conductor 23 connecting the switch member 22 to one input terminal of an amplifier and motor drive device K, and a conductor 24 connecting the second input terminal of the device K to the slider contact $i$. The amplifier and motor drive device K is like the device E of the device D, including a converter for converting a unidirectional current signal, preparatory to its amplification, into an alternating current signal of a magnitude and phase depending on the magnitude and direction of unbalance of the unidirectional current.

The device K is energized by branches 25 and 26 of the alternating current supply conductors L' and $L^2$. The device K includes rectifying means, and through conductors 27 and 28 supplies unidirectional energizing current to the transmitting or follower circuit including the slide wires G and I. Alternatively, the rectifying means of device K may be omitted and alternating current may be supplied through conductors 27 and 28 to the transmitting circuit. When the latter circuit is so energized, the converter of the amplifier and motor drive device K is not needed and may be eliminated since the input signal will then be alternating in character.

In regular operation, the normal positions of the contacts $g$ and $i$ along the resistors G and I, respectively, are such that the potential of the contact $i$ is similar to that of the contact $g$. On a change in the moisture content or regain of the material A, and the resultant adjustment of the contact $g$ along the slide wire G, the potential of the contact $g$ ceases to be equal to the potential of the contact $i$, and thereupon current flows between the conductors 23 and 24 through the input circuit of the device K. The device K then supplies motor operating current to the control winding 29 of a rebalancing motor M. The motor M may be identical in construction and operation with the rebalancing motor F, and comprises a power winding 30 connected in series with a condenser 31 across the alternating current supply conductors L' and L². The windings 29 and 30 cooperate to effect rotation of the rotor of the motor M in the direction and to the extent required to adjust the slider contact $i$ into the position in which its potential is the same as the potential of the contact $g$. A slide wire resistor O, having a slider contact $o$, is connected in parallel with the resistor I for a purpose to be described hereinafter.

The switch member 13, conductor 13' and contact 12 form elements of the timing mechanism P through which the position of the switch member 13 is controlled. The position of the switch member 13 controls the energization of a relay PA. The latter includes the switch blade 22 and a solenoid coil 32 which, when energized, holds the switch blade 22 in engagement with the switch contact 21, and when the coil 32 is deenergized, the switch blade 22 drops out of engagement with the contact 21 and into engagement with a contact 40 and thereby establishes another circuit through a conductor 41 to the contact $o$ as is hereinafter explained. One terminal 33 of the winding 32 is connected to the stationary switch contact 12, and is connected to the supply conductor L' when, and only when, the switch member 13 is in engagement with the switch contact 12 and the switch H is closed. The second terminal 34 of the winding 32 is connected through a conductor 35 to the supply conductor L².

As diagrammatically indicated in Fig. 1, the angular movements of the motor M effect adjustments of an air controller N. The latter may well be of the previously mentioned type disclosed in the Mallory Patent 2,202,218, and may directly control the speed with which the material A is moved through the slasher and between the detector contacts B and B'. Thus, for example, the air controller N may directly control a diaphragm motor as does the air controller shown in the Mallory patent, and the diaphragm motor may be employed to operate a speed control rheostat mechanism in one direction or the other, and thereby increase or decrease the slasher speed of operation, as that speed of operation is increased or decreased in the Wills Patent 2,215,805. The motor M also positions a recording pen, not shown, of the instrument J through a suitable mechanical linkage 43.

The previously mentioned timer mechanism P may be, and as diagrammatically shown in Fig. 1, is of a known commercial type, and includes an electromagnetic clutch element Q, a motor R, and associated switch mechanism comprising the movable switch member 13 and stationary contacts 12 and 42. In regular operation of the slasher, the clutch element Q is energized through a circuit including the switch H, then closed, the conductor 13', the winding of the clutch Q and the conductor 35. When the slasher operation is interrupted or slows down so that the switch H opens, the clutch Q is deenergized, and the switch member 13 then moves out of engagement with the stationary contact 12 and into engagement with the stationary contact 42. The engagement of the switch member 13 with the contact 42 connects the terminals of the motor R to the terminals of the clutch, but does not thereby energize the motor R, since the switch H is then open. When, thereafter, the slasher is again caused to operate at full speed and the switch H is reclosed, the clutch Q and timer motor R are both energized. The energization of the timer motor R produces no immediate change in the operating conditions, but after the timer has operated for its delay period which may well be, and is herein assumed to be, two minutes, the switch member 13 is adjusted from its position shown in Fig. 1, into the position in which it engages the contact 12. As the switch member 13 moves out of engagement with the contact 42, the motor R is deenergized, and, thereafter, the motor R remains in its deenergized condition until the operation of the slasher is again interrupted and is thereafter again returned to operation at full speed. When the slasher operation is interrupted, the switch H opens. While the opening of the switch H has no immediate effect on the energization of the motor R, it does deenergize the clutch Q, and thereby permits the switch member 13 to move out of engagement with the contact 12 and into engagement with the contact 42, and thus resets or "cocks" the timer mechanism, so that when the slasher is again put into operation at full speed, the resultant closure of the switch H will start the motor R into operation.

The movement of the switch member 13 into and out of engagement with the stationary contact 12 energizes and deenergizes the relay PA. In consequence, the switch member 22 is maintained in engagement with the contact 21 only during the periods in which the slasher is in operation at full speed. In the contemplated operation of the apparatus shown, when full speed operation of the slasher is interrupted and the relay PA is deenergized, so that the switch member 22 drops into engagement with the contact 40, the contact $o$ should occupy a position along the slide wire O corresponding to the "set-point" of the instrument J. Stated differently, the slider contact $o$ should then occupy a position, relative to the slide wire resistor O, corresponding to the position of the slider contact $i$ relative to the slide wire I when the recording pen of the instrument J is in register with the scale mark corresponding to the moisture content of the material A which the control apparatus is adjusted to maintain. The adjustment of the slider contact $o$ along the slide wire resistor O, if any, required to establish the described relation between the position of the contact $o$ and the set-point position of the pen can be effected by means of a false balance set knob 44. The rotation of the latter moves the contact $o$ along the slide wire O in a direction depending on the direction of knob rotation.

With the slider contact $o$ maintained in the described adjustment position throughout the period beginning when the operation of the slasher is interrupted, or slowed down, and continuing until the slasher has been in operation for the two minute timer delay period, the only adjustment, if any, which the device K can make, is the adjustment effected through the motor M of the contact $i$ and the air controller N which will return the recorder pen to its set-point position, if it was not in that position when the relay PA was deenergized. The effect of the described adjustment of the slider contact $o$, when the relay PA has been deenergized, is to make its potential equal to the potential of the contact $i$, so that as long as the switch member 22 remains in engagement with the contact 40, and the contact $i$ is in its set-point position, there will be no current flow between the conductors 23 and 24 through the input circuit of the amplifier K. In consequence, the motor M will then remain stationary until after the slasher is again in operation at full speed.

The opening of the switch H and resultant adjustments of the switch members 13 and 22 into their positions shown in Fig. 1 produces three desirable control actions or effects; namely, 1. The return of the instrument pen to the set-point of the instrument J if initially displaced therefrom, which results from the replacement of the slider contact $g$ by the slider contact $o$ in the input circuit of the amplifier and motor drive device K;

2. The deenergization of the transmitter balancing motor F which is effected when the switch H is opened; and 3. The return to automatic control of the moisture content in the material A, only after the slasher has been returned to and maintained in normal operation for the two minute delay period of the timer P.

In the operation of the moisture control apparatus shown in Fig. 1, a number of advantageous results are obtained: thus, with the recorder pen at the set-point, there can be no automatic control action and no reset accumulation during shut-down, and when the slasher is again started into operation, the automatic reset adjustment position of the air controller N is approximately that required, and no major readjustment is required in reestablishing automatic control.

With the auxiliary slide wire O and contact $o$ cooperating to provide a control signal, the control air pressure is maintained at approximately the value it had at shut-down during the period starting with the initiation of the shut-down and continuing until automatic control is reestablished, the control element N is maintained in approximately the condition required for regular operation when automatic control is resumed, and the temperature and pressure controllers used in cascade in association with the apparatus disclosed in Fig. 1 can be maintained at correct operating points. Moreover, with the transmitter balancing motor F open-circuited during each period in which automatic control is interrupted, the transmitting slide wire contact $g$ remains during said period in approximately the position in which it needs to be when automatic control is resumed.

The control and reset actions are effectively locked out, and the resumption of automatic control is prevented during the period, assumed to be two minutes, required for the controlled process to reach approximately stable conditions, and the record more truly represents operating process conditions than it would if the recorder pen were adjusted in accordance with the progressive decrease in moisture content in the material A occurring during the shut-down period.

Thus in Fig. 2, the irregular transverse portions of the record curve 46, traced on a rotating record disc chart 45 by the recorder pen of the instrument J of Fig. 1, indicate the variations in the moisture content of the material A, measured by the apparatus shown in Fig. 1, during the regular operation portions of a run of several hours in which shut down periods alternated with periods in which the slasher apparatus was in regular operation. The smooth arc-shaped portions 47 of the curve 46 indicate the periods in which automatic control was made temporarily inoperative as a result of interruptions of the regular operation periods. If the motor M had been adjusted in accordance with variations in the moisture content of the material A during the irregular operation periods, each smooth arc 47 would be replaced by a section of the curve 46 including one or more elongated transverse curve sections. Those curve sections could provide no really useful information, except as they would indicate the shut-down periods, which are more clearly and positively indicated by the smooth arcs 47. The arcs 47 not only indicate the irregular operation periods, but also indicate the set-point values of the material regain or moisture content.

The circuit including the slide wire resistors G and I, conductors 16 and 17, and resistors 18 and 19, causes the slider contacts $g$ and $i$ to follow the movements of the slider contact $c$, and thereby causes the adjustment movements of the motor M to follow the adjustment movements of the motor F and is commonly called a "follower circuit." The use of such a follower circuit has certain practical advantages. For one thing, it permits the recording and control instrument J to be located at a greater distance from the measuring contacts B and B' included in the slasher than would otherwise be possible. Another practically important advantage is that it permits the relatively simple and inexpensive blind measuring instrument D to be used in effecting different kinds of controls by coupling the instrument D through the follower circuit to any one of a plurality of different measuring and control instruments, some of which may be quite different in character from the instrument J.

The follower circuit shown in Fig. 1 may take different forms. Thus, for example, in the follower circuit shown in Fig. 3, the slide wire resistors G and I of Fig. 1 are replaced by inductive windings or coils GA and IA respectively. The mid-point of the coil GA is permanently connected by a conductor 50 to the slider contact $oa$ engaging the auxiliary slide wire OA. The elements OA and $oa$ of Fig. 3 may be identical with the elements O and $o$, respectively, of Fig. 1, and serve the same purposes as do the elements O and $o$ of Fig. 1. As shown, however, the switching mechanism employed to operatively connect the coil IA either to the winding GA, or to the resistor OA, as the relay winding 32 is energized and deenergized, differs in form from the means shown in Fig. 1 for operatively connecting the resistor I to the resistor G or to the resistor O. In Fig. 3, the terminal conductors 51 and 52 of coil GA are connected to stationary switch contacts 53 and 54 respectively, the terminal conductors 55 and 56 of the coil IA are connected to movable switch members 57 and 58 respectively, and the end terminals of the resistor OA are connected to stationary switch contacts 59 and 60 respectively. The contact oa is connected to the midpoint of the coil IA by the conductor 23a, the input circuit of the amplifier KA, and the conductor 24a. When the relay 32 is energized, the solenoid core or armature holds the switch members 57 and 58 in engagement with the switch contacts 53 and 54, respectively, and thus operatively connects the coils IA and GA and leaves the resistor OA in an open circuit. When the relay 32 is deenergized, the switch members 57 and 58 are moved out of engagement with the contacts 53 and 54 and into engagement with the contacts 59 and 60, respectively. In their new positions, the switch members 57 and 58 operatively connect the resistor OA to the winding IA and leave the winding GA in an open circuit.

The follower circuit shown in Fig. 3 is intended for AC energization, and to that end, the terminals of the coil IA are connected through terminal conductors 61 and 62 to alternating current supply conductors L' and L².

When the winding GA and the winding IA are operatively connected through the switch members 57 and 58, the two windings or coils form part of a bridge circuit which is normally balanced, but which is unbalanced when the associated measuring circuit is unbalanced by the rebalancing motor FA. The latter may be similar in construction, operation and general operative effect to the motor F of Fig. 1. As diagrammatically shown in Fig. 3, the motor FA produces its operative effect on the follower circuit by adjusting the core 63 associated with the solenoid winding GA longitudinally of the latter through a gear 64 rotated by the motor FA and in mesh with a rack bar 65 connected to the solenoid core 63. The adjustment of the latter varies the relative impedances of, and potential drops in, the sections or portions of the winding GA connected at opposite sides of the point connected to the conductor 50. When the follower circuit is thus unbalanced, the motor MA controlled by the device KA of Fig. 3, as the motor M is controlled by the device K of Fig. 1, gives a rebalancing adjustment to the armature or solenoid core 66 associated with the solenoid core IA. That adjustment varies the relative impedances of, and potential drops in, the portions of the impedance IA at opposite sides of its points connected to the conductor 24a.

As diagrammatically shown in Fig. 3, the motor MA is operatively connected to the core 66 through a gear 67, rotated by the motor, and a rack bar 68 connected to the core. Through a connection 69 to the rack bar, the motor MA may adjust an air controller M as does the motor M of Fig. 1. When the relay winding 32 of Fig. 3 is deenergized and the switch members 57 and 58 operatively connect the slide wire OA across the coil IA and open circuit the coil GA, the motor MA is automatically actuated to adjust the core 66 into the position in which there is no current flow through the input circuit of the amplifier KA, if not already in that position. The contact oa may be adjusted along the slide wire OA by the device 44 in the same manner and for the same purposes as the contact o is adjusted along the slide wire O of Fig. 1.

The arrangement shown in Fig. 3 is not restricted to use in association with a measuring system of the type shown in Fig. 1, but is adapted for use in arrangements in which the follower circuit armature or solenoid core 63 is adjusted by other measuring apparatus, such, for example, as electric type flow meters and position indicating devices. For example, the system shown in Fig. 3 is well adapted for use on a control system for effecting the reversal of an open hearth furnace in which the flow of fuel to the furnace may be measured and controlled by an air controller and is shut off for a short period during each reversal period.

In the operation of the apparatus shown in Fig. 3, there is no physical adjustment of the intermediate terminals of the inductance elements IA and GA, but this results in no difference in control mechanism operation between the apparatus shown in Fig. 1 and that shown in Fig. 3. In the Fig 3 apparatus, a change in the value of the quantity being measured results in a longitudinal adjustment of the armature or solenoid core 63. This changes the relative impedances and potential drops in the portions of the impedance element GA at opposite sides of the point thereof to which the conductor 50 is connected, just as the impedance values of the portions of the slide wire resistor G at opposite sides of the slider contact g are changed by the adjustment of the latter along the resistor G resulting from a change in the value of the quantity measured. In Fig. 3, the adjustment of the armature 63 results in an adjustment of the armature core 66 and a resultant change in the relative impedances of the portions of the impedance element IA at opposite sides of the point of the element to which the conductor 24a is connected which is the same as the changes in the relative impedances of the portions of the slide wire resistor I at the opposite sides of the slider contact i resulting from a corresponding adjustment of the latter.

The general principles of the present invention may be used to prevent reset accumulation with apparatus which includes no follower circuit. Thus, for example, the present invention may be utilized in connection with the conventional null type of self-balancing potentiometric measuring and control apparatus, employed to measure a voltage such as a thermocouple voltage in the precise manner in which such a voltage is measured with the apparatus disclosed in the above mentioned Wills patent. The use of the present invention in connection with such apparatus is diagrammatically illustrated in Fig. 4, wherein a measuring slide wire CA is connected in series with resistors 70 and 71 in one branch of a split potentiometer measuring circuit S. The energizing branch of the circuit S includes a source of unidirectional current 72, and an adjustable calibrating resistance 73. The circuit S also includes a third branch comprising resistors 74 and 75 connected in series with one another to the terminals of the energizing branch, and to the terminals of the branch including the slide wire CA. The slider contact c engaging the slide wire resistor CA is connected by a conductor 76 to one terminal of the source of voltage to be measured, shown as a thermocouple 77.

The second terminal of the thermocouple 77 is normally connected through a calibrating switch member 79, a relay switch member 80 and a conductor 81 to one input terminal of a voltage and motor drive amplifier KB. The second input terminal of the device KB is normally connected through a conductor 82 and a switch member 83 to the potentiometer circuit S at a point 84 between the resistors 74 and 75 in the third branch of that circuit. The amplifier device KB has energizing terminals 85 and 86 connected to alternating current supply conductors L' and L². The output circuit of the amplifier KB includes the control winding 87 of a motor MB, the power winding 88 of which is connected in series with a condenser across the supply conductors L' and L². The motor MB normally operates to adjust the slider contact c along the slide wire resistor CA in response to variations in the voltage of the thermocouple 77, just as the rebalancing motor F of Fig. 1 adjusts the slider contact c along the resistor C of that figure in response to variations in the moisture content measured. The motor MB is also like the motor M of Fig 1 in that it actuates a controller NB which may be like the air controller N of Fig. 1. The motor MB is like the motor M of Fig. 1 also in respect to its association with the relay PA which is energized and deenergized by a timer mechanism P which may be exactly like the timer mechanism P of Fig. 1.

The mechanism P of Fig. 4 has its terminal 35 connected to the supply conductor L², and has its second terminal 13' connected through a switch mechanism H and conductor 15' to the supply conductor L'. As shown, the switch mechanism H comprises a switch blade h which is manually adjustable to connect the terminal 13' to and disconnect it from the conductor L'. The relay winding 32 is connected to the mechanism P through conductors 33 and 34 as in Fig. 1. When the winding 32 of the relay PA is energized, the switch members 80 and 83 are maintained in their normal positions, shown in Fig. 4, by the action of the winding 32 on an armature or solenoid core 89 shown as pivotally connected to the switch member 80 and the switch member 83. When the winding 32 is deenergized, the armature 89 moves upward and tilts the switch arm 80 out of engagement with the calibrating switch member 79 and into engagement with a conductor 90 connected to the conductor 76, and tilts the switch arm 83 out of engagement with the switch contact connected to the point 84 of the circuit S, and into engagement with a conductor 91 connected to a slider contact ob engaging and adjustable along a slide wire resistor OB which is connected across the terminals of the measuring slide wire resistor CA.

In Fig. 4, the switch 79 forms the so-called standardizing switch of a conventional recalibrating circuit including a standard cell Sc and conductors 92 and 93 by which the switch 79 and cell Sc are connected in series with the resistor 75 of the potentiometer measuring circuits. The capacity of the apparatus shown in Fig. 4 for use in the practice of the present invention does not require the inclusion or omission of the standardizing circuit.

The immediate operative result of the deenergization of the relay PA of Fig. 4 is a modification in the detector circuit through which the circuit S is operatively connected to the amplifier KB. That modification amounts in substance to the replacement of the thermocouple 77 and the resistors 70, 71, 74 and 75 by the conductors 90 and 91, the slider contact ob and the slide wire OB. In the contemplated operation of the apparatus, the position of the slider contact ob along the resistor OB may correspond to the assumed normal pen or control set-point, or the contact may be adjusted into a position corresponding to the actual value of the set-point at the time at which the relay winding 32 is deenergized.

The deenergization of the relay PA is effected by opening the switch H. The reenergization of the relay PA requires the closure of the switch H which may be followed by the delay action of the timer mechanism P by which the switch blade 13 is moved into engagement with the contact 12. In respect to its effect on the reset action and the automatic control action of the controller MB, the deenergization of the relay PA of Fig. 4 produces results precisely analogous to the results produced by the deenergization of the relay PA of Fig. 1.

Notwithstanding the plainly apparent structural differences between the embodiments of the invention illustrated in Figs. 1, 3 and 4, the three embodiments are equivalents in respect to their provisions for avoiding undesirable reset accumulation during shut downs and periods in which the controlled process is not operating at normal value. This becomes readily apparent when account is taken of the fact that the slide wire resistors I, G, and O of Fig. 1 constitute first, second and third impedance elements of a measuring and control circuit network, as do the inductance elements IA and GA and slide wire resistor OA of Fig. 3, and the branches of the circuit network shown in Fig. 4 respectively including the slide wire resistor CA, the resistors 74 and 75, and the slide wire resistor OB.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. Measuring and control apparatus comprising a circuit network including first, second and third impedance elements each having end terminals and an intermediate terminal, conductors for connecting the end terminals of said first impedance to a source of network energizing current, switch mechanism adjustable between a normal condition and a second condition, conductors cooperating with said mechanism to connect the end terminals and intermediate terminal of said first element to the end terminals and intermediate terminal, respectively, of said second element, or of said third element, accordingly as said switch mechanism is in its normal or its second condition, respectively, means normally operative to inversely vary the impedances of the portions of the first element at opposite sides of its intermediate terminal in automatic response to a variation in a quantity being measured, manually controlled means adjustable to inversely vary the impedances of the portions of said third element at opposite sides of its intermediate point, a relay mechanism operating in response to a potential difference between the intermediate terminal of said first impedance element and the intermediate terminal of whichever of said second and third elements has its end and intermediate terminals, respectively, connected to the end and intermediate terminals of the said first element, to vary the relative impedances of the portions of said first element at opposite sides of its intermediate terminal in the direction to reduce said potential difference, and a control mechanism adjusted by said relay means and including reset provisions and operative, when said switch mechanism is in its normal condition, to produce control effects in accordance with the departure of the actual value from the set-point value of the quantity measured.

2. Apparatus as specified in claim 1, in which each of said impedance elements is a slide wire resistor and in which a separate slider contact individual to, and adjustable along each of said resistors constitutes the intermediate terminal of said resistor.

3. Apparatus as specified in claim 1, in which each of said first and second impedance elements is an inductance element and in which the intermediate points of said first and second elements are fixed and which comprises a separate part in inductive relation with each inductance element and adjustable longitudinally thereof to vary the relative impedances of the portions of the element at opposite sides of its intermediate terminal.

4. Apparatus as specified in claim 3, in which said third impedance element is a slide wire resistor and its intermediate terminal is a slider contact engaging and adjustable along said resistor.

5. Apparatus as specified in claim 1, in which said circuit network comprises a potentiometric measuring circuit and in which each of said first and third impedance elements comprises a slide wire resistor portion of said measuring circuit, and in which said apparatus comprises a separate slider contact engaging and adjustable along each slide wire resistor and conductor means including connections to a source of current to be measured which connect said slider contact in engagement with said first resistor to the intermediate terminal of said third resistor when said switch mechanism is in its normal condition, and conductor means disconnected from said source of current which connect the two slider contacts when said switch mechanism is in its second condition.

6. Apparatus as specified in claim 1 in which said circuit network comprises a follower circuit of which said second and first impedance elements constitute the transmitter and receiver sections, respectively, and in which the relative impedances of the portions of said second element at opposite sides of its intermediate terminal are varied in proportion to changes in the value of the quantity being measured.

7. Apparatus as specified in claim 6, in which each of said first and second impedance elements is a slide wire resistor and in which a separate slider contact engaging and adjustable along each of said first and second elements constitutes the intermediate terminal of the element.

8. Apparatus as specified in claim 1, in which said circuit network comprises a split potentiometric measuring circuit including an energizing branch and in which each of said impedance elements consists of resistance included in a separate branch of said network in series with said energizing branch and in which each of said first and third elements is a slide wire resistor and which includes a separate contact engaging and adjustable along each of said slide wire resistors and constituting the intermediate terminal of the circuit branch including the corresponding slide wire resistor.

9. Apparatus as specified in claim 1, including means for initiating the adjustment of said switch mechanism from its second position back into said normal position, and a timer mechanism for delaying the completion of said adjustment.

10. Apparatus as specified in claim 1, in which said switch mechanism is adjusted between its normal and second positions by means comprising a relay and relay energizing and deenergizing means including a switch and adapted by an adjustment of said switch in one direction to deenergize said energizing means and adapted by its adjustment in the opposite direction to reenergize said energizing means, and a timing mechanism retarding the reenergization of said energizing means for a predetermined time period following the last mentioned adjustment of said switch.

11. A subcombination for use in measuring and control apparatus, comprising a circuit including first, second and third impedance elements each having end terminals and an intermediate terminal, conductors for connecting the end terminals of said first impedance to a source of network energizing current, switch mechanism adjustable between a normal condition and a second condition, conductors coacting with said mechanism to connect the end terminals and intermediate terminal of said first element to the end terminals and intermediate terminal, respectively, of said second element, or of said third element, accordingly as said switch mechanism is in its normal or its second condition, respectively, means adjustable to inversely vary the impedances of the portions of the first element at opposite sides of its intermediate terminal, means adjustable to inversely vary the impedances of the portions of said third element at opposite sides of its intermediate point, and a relay mechanism operating in response to a potential difference between the intermediate terminal of said first impedance element and the intermediate terminal of whichever of said second and third elements has its end and intermediate terminals respectively connected to the end and intermediate terminals of said first element, to vary the relative impedances of the portions of said first element at opposite sides of its intermediate terminal in the direction to reduce said potential differences.

LEE E. CUCKLER.

REFERENCES CITED

The following references are of record in the file of this patent:

UNITED STATES PATENTS

| Number | Name | Date |
| --- | --- | --- |
| 890,458 | Schley | June 9, 1908 |
| 2,135,991 | Nessell | Nov. 8, 1938 |
| 2,446,163 | Wannamaker | July 27, 1948 |